United States Patent [19]

Regunathan et al.

[11] Patent Number: 4,645,601
[45] Date of Patent: Feb. 24, 1987

[54] QUICK CHANGE REVERSE OSMOSIS ASSEMBLY

[75] Inventors: Perialwar Regunathan, Wheaton; Jack W. Thomsen, LaGrange, both of Ill.

[73] Assignee: Everpure, Inc., Westmont, Ill.

[21] Appl. No.: 645,854

[22] Filed: Aug. 31, 1984

[51] Int. Cl.$^4$ .................................. B01D 13/00
[52] U.S. Cl. ................... 210/433.2; 210/438
[58] Field of Search ............ 210/438, 439, 321.1, 210/433.2, 494.1, 440, 443, 232, 257.2

[56] References Cited

U.S. PATENT DOCUMENTS

| | | | |
|---|---|---|---|
| 3,679,055 | 7/1972 | Clark et al. | 210/257.2 X |
| 3,695,446 | 10/1972 | Lyall et al. | 210/438 X |
| 3,746,171 | 7/1973 | Thomsen | 210/439 X |

Primary Examiner—Frank Spear
Attorney, Agent, or Firm—Frank R. Thienpont

[57] ABSTRACT

A reverse osmosis sytsem for water treatment including a head member adapted to be fixedly mounted in a fliud supply line, an integral disposable reverse osmosis unit inserted into said head member, said osmosis unit including a pressure vessel, an end member attached to said pressure vessel and a reverse osmosis membrane module disposed in said pressure vessel and operatively associated with said end member.

21 Claims, 1 Drawing Figure

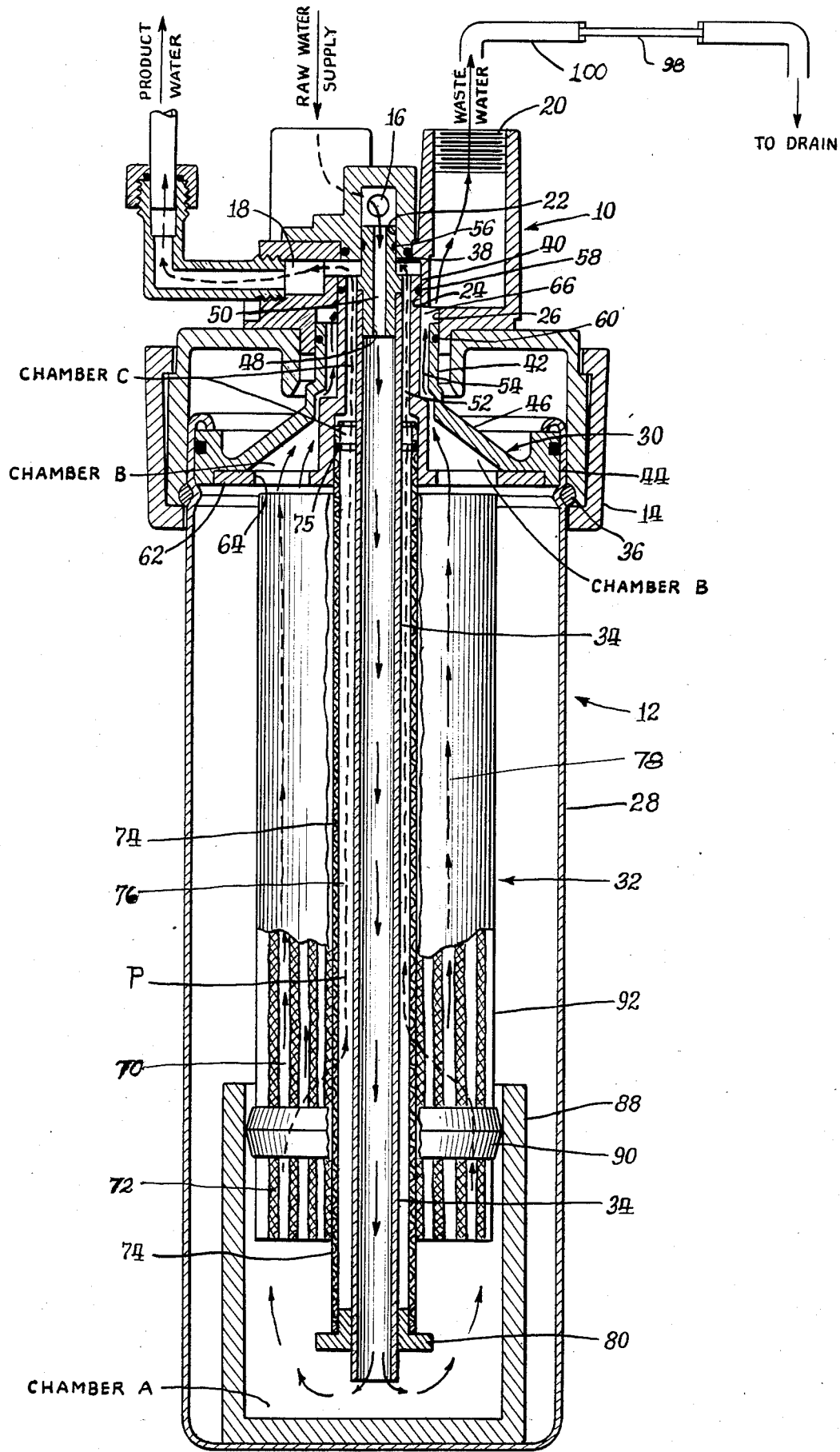

QUICK CHANGE REVERSE OSMOSIS ASSEMBLY

BACKGROUND OF THE INVENTION

This invention relates to a reverse osmosis system and particularly to an integral disposable reverse osmosis unit which may conveniently be inserted into and removed from a system.

Brackish water has an unacceptable taste that can be remedied by water treatment processes such as reverse osmosis. Spirally wound, tubular, or hollow fiber reverse osmosis membrane modules are used for reducing the mineral quantity in potable water or in water used for preparing ice, beverages, etc. These modules are housed in permanent pressure vessels which may be made of PVC, stainless steel, or fiber reinforced plastic material. The reverse osmosis process requires a certain level of water pressure to push the water through the membrane, leaving the removed minerals on the surface of the membrane. The accumulated minerals are washed off the membrane by a reject or waste stream of water flowing at a fairly high velocity along the surface of the membrane. This basic requirement of water pressure and water flow can be met by line pressure existing in a water supply system or can be provided by a pump operating to provide such conditions. Higher water pressures result in larger flows through the membrane and also better rejection of unwanted minerals.

The modules contained in presently used pressure vessels slowly lose their effectiveness to remove minerals due to various chemical and physical aspects of mineral build-up on the surface of the membrane. When the flow through the membrane surfaces becomes too slow or too poor in quality for intended end use, the water flow is stopped usually with an appropriate valve ahead of the system, the pressure vessel is opened, and the used reverse osmosis membrane module is removed from the vessel and discarded. A new membrane module is inserted into the vessel, retaining means are fastened, the vessel is closed, and the valve is opened so that the required operating conditions can be reestablished.

The process of changing modules can be very messy and time consuming. In some areas under some operating conditions, the changing process may have to be done often, resulting in high maintenance costs. Additional difficulties are encountered when the devices are located and mounted in rather inaccessible places.

Accordingly it becomes appropriate to develop a reverse osmosis assembly in which an integral disposable reverse osmosis unit can be inserted in a head member and then be removed and replaced as a unit thereby avoiding a plurality of problems now commonplace with existing units.

SUMMARY OF THE INVENTION

A principal object of the invention herein is to provide an integral reverse osmosis unit which can be easily and quickly removed and replaced.

Another object is to provide an integral reverse osmosis unit which will avoid the piece by piece removal and replacement of a used reverse osmosis module.

Another object is to provide a reverse osmosis unit including a pressure vessel being constructed at its one end in such a manner as to be easily insertable into and removable from a head member which is mounted in a fluid inlet line.

The above objects and advantages will become more apparent when considered in conjunction with the accompanying drawings and the following description.

BRIEF DESCRIPTION OF THE DRAWINGS

FIG. 1 is a view in elevation and partially in section of a reverse osmosis assembly embodying the invention herein.

DESCRIPTION OF PREFERRED EMBODIMENT

The reverse osmosis system includes generally a head member 10, and a reverse osmosis unit 12 operatively connected in the reverse osmosis system. In the embodiment described herein a clamping collar 14 is associated with the head member and is effective to support and releasably secure the reverse osmosis unit in the head member. The head member 10 is designed to be permanently mounted in a fluid inlet line.

The head member 10 preferably is of plastic construction. It has formed therein an inlet port 16 and a pair of outlet ports 18 and 20. The inlet port 16 is adapted to be connected to a raw water supply system and is adapted for fluid communication with a reverse osmosis unit. A valve unit (not shown) is associated with the inlet port 16 to control the flow of raw influent water to the inlet port. The outlet ports also are adapted for fluid communication with a reverse osmosis unit inserted into the head member. One of the said outlet ports 18 is the discharge port for purified water coming from the reverse osmosis unit and the otherof the outlet ports 20 is the discharge port for waste water coming from the reverse osmosis unit.

The head member 10 is constructed internally with 3 concentric bores 22, 24 and 26 each adapted to sealingly engage tubular portions of a closure member of the reverse osmosis unit.

In the particular embodiment described herein the clamping collar 14 is operatively associated with the head member 10 in the same manner as is described in U.S. Pat. No. 3,746,171 for a Filter Assembly issued July 17, 1973 and assigned to the same assignee as this application. The clamping collar 14 in association with the head member 10 operates to retain a pressure vessel in the head member in the same manner as is described in U.S. Pat. No. 3,746,171. It should be understood that other methods of retaining the pressure vessel in the head member 10 could be used without departing from the scope of the invention herein.

The reverse osmosis unit comprises an elongated pressure vessel 28 an end or closure member 30 disposed in the open end of the pressure vessel, a reverse osmosis module 32 disposed in the pressure vessel 28 and attached to the closure member 30 and an elongated tube 34 attached to the closure member 30 and extending through the reverse osmosis module. The pressure vessel preferably is of metal construction but may be of heavy plastic. The pressure vessel is constructed with means for retaining it in the head member. Such means may include a pair of diametrically disposed outstanding ridge surfaces 36 formed on the upper end thereof as described in U.S. Pat. No. 3,746,171 issued July 17, 1973 and assigned to the same assignee as this application.

The end or closure member 30 which is disposed in and attached to the upper end of the pressure vessel in sealed engagement therewith is designed to cooperate with the head member 10. The closure member, which preferably is of a hard plastic material, is formed with a plurality of passageways which in the reverse osmosis system form part of the inlet and outlet passageway system for permitting fluid to enter and exit from the reverse osmosis unit. The closure member 30 is of such construction as to provide the appropriate passageway system and at the same time be compatible with the head member into which it is adapted to be inserted. As here shown the closure member is of a somewhat generally tapered or conical-like construction. This construction, however, may take various forms to accomodate the construction of the particular head member with which it is to be associated. The closure member is annular in construction to fit in the open end of the pressure vessel 28. It includes a first tubular portion 38 a second tubular portion 40 and a third tubular portion 42 all disposed coaxially with each other, a rim portion 44 also disposed coxially with said first, second and third tubular portions and a web portion 46 interconnecting the third tubular portion 42 and rim portion 44. An axial bore 48 extends through the first tubular portion 38 to define a fluid inlet passage 50. The second tubular portion 40 is radially spaced from the first tubular portion 38 to define therebetween a second fluid passage 52, and a third tubular portion 42 is spaced from the second tubular portion 40 to define a third fluid passage 54. Seal means is associated with each of said tubular portions to provide sealing engagement with the head member 10 into which the reverse osmosis unit 12 is inserted. As herein shown O-ring seals 56, 58 and 60 are disposed on the first, second and third tubular portions respectively to provide sealing engagement with bores 22, 24 and 26 respectively of the head member 10.

The rim portion 44 of closure member 30 is sealingly positioned in the upper end of pressure vessel 28. The closure member may be constructed with an annular base member 62 in its lower end, with a plurality of openings 64 being formed in the base member to provide communication between the reverse osmosis module 32 and the waste water passage 66 formed in the head member.

The elongated inlet tube 34 is connected to and is in fluid communication with the first tubular portion 38 of the closure member. The tube 34 extends down into the pressure vessel through the reverse osmosis module and provides in this case a fluid inlet passage into the bottom of the associated pressure vessel 28.

The reverse osmosis module 32 includes a reverse osmosis membrane 70 which in conjunction with a coextensive grid member 72 is spirally wound, usually in several layers, on a perforated tube 74 which preferably is made of plastic. The plastic tube 74 is formed with many preforations along its length to pass clean liquid there-through. In the assembly as herein shown the upper end of the perforated tube 74 is sealingly attached to the closure member 30 by seal 75 and is radially spaced from inlet tube 34 to provide therebetween a circumferentially extending passageway 76. The tube 74 also could be molded as one piece with closure member 30. This passageway 76 is adapted to receive the purified water or other liquid being processed which has been forced through the reverse osmosis member 70 under pressure and from there it flows to the product water outlet 18 in head member as indicated by the flow path 78 shown in a full line.

A plug member 80 is disposed in the lower end of tube 74, and inlet tube 34 extends through plug member 80 being in sealed relation therewith. This arrangement is effective to seal the inlet water flowing down through tube 34 from contact with the processed product water entering passageway 76 after passing through the reverse osmosis membrane 70.

Means are provided to create a chamber at the lower end of the unit into which raw influent water will discharge from inlet tube 34. In one manner of accomplishing this a cup like member 88 is sealingly attached to the lower end of reverse osmosis module 32 with a ring seal member 90 being disposed between the cup-like member 88 and the outer wrap 92 of the reverse osmosis module 32. This creates a chamber A into which raw inlet water under line pressure flows from the inlet tube 34. The water may continue its flow upward under pressure through the laminations of module 32 as indicated by the broken line flow path P. During the course of this flow some of the water is purified by removal of certain undesriable mineral elements, and the pure water is forced through the membrane 70, then through perforated tube 74 and into passage 76 and out through outlet port 18 in the head member 10 as indicated in part by the broken line flow path P. Other means may be provided to create such a Chamber A. For example, Chamber A could be created by sealing directly to the pressure vessel 28 instead of using the cup-like member 88.

During the course of water flow mineral impurities are separated out because they cannot penetrate the module membrane 70. These impurities settle on the membrane surface and they are removed by water flowing along the surface of the membrane and out through openings 64, Chamber B and waste water outlet 20.

A capillary tube 98 may be disposed in the drain line 100 which is connected to outlet port 20 in the head member. The capillary tube serves to restrict the flow of waste water through the reverse osmosis module 32. Other types of restrictions such as fixed orfices or flow controls, which under certain circumstances may be more preferable, also may be used to create this back pressure in Chamber B. Such a restriction holds back most of the pressure and fluid flow from Chamber B and allows only sufficient flow to flush away the impurities which collect on the surface of membrane 70 and permit them to flow to drain.

While the operation of the reverse osmosis system should be reasonably clear from the above description and accompanying drawings we now summarize the operation briefly. Raw influent under line pressure enters inlet port 16 under p ressure and flows downwardly through inlet port 16 and the inlet tube 34 connected thereto into Chamber A. Because the influent water is pressurized it will move upwardwardly through the laminations of the reverse osmosis membrane 70 to Chamber B out to outlet port 20. At the outlet port 20 a restriction or other means permits only limited flow and creates a back pressure in Chamber B which is effective to force some of the water flowing over the membrane 70 to penetrate through the membrane 70 leaving behind on the surface of the membrane the dissolved solids and impurities and allowing the purified water to enter Chamber C which is at a low pressure. The pure water in Chamber C enters from the passage 76 between the inlet tube 34 and the perforated tubular sleeve 74 upon which the laminations of the module membrane 70 are wound. The purified water then proceeds to the outlet port 18 in the head member.

When the membrane loses its ability over a period of weeks, months or a year to effectively remove the minerals, then it is time to change the module. To accomplish such change out, a shut-off valve (not shown) is closed to shut off line pressure. The pressure vessel 28 containing the used membrane module and the integral closure member 30 is removed from the head member 10. A new pressure vessel with a new membrane module and its own integral closure member then is inserted into the head member. The shut-off valve is then opened and the system again is ready for operation.

It will be apparent that we have advantageously provided an integral disposable reverse osmosis unit which may be quickly replaced as an entire unit thus eliminating the necessity of dismantling the components of a pressure vessel assembly to remove and replace a reverse osmosis membrane module.

While a preferred embodiment of the invention has been disclosed, it will be appreciated that this is shown by way of example only, and the invention is not to be limited thereto as other variations will be apparent to those skilled in the art and the invention is to be given its fullest possible interpretation within the terms of the following claims.

What is claimed is:

1. In a reverse osmosis unit for use in a reverse osmosis system the combination comprising:
    a pressure vessel having a reverse osmosis module disposed therein;
    a closure member in permanent sealed relationship with the open end of said pressure vessel and having the reverse osmosis module connected thereto, said closure member including first, second and third concentrically disposed tubular portions defining first, second and third openings;
    said first, second and third openings defining an inlet and two outlet fluid passages to lead to and from the reverse osmosis unit with which said closure member is associated;
    said tubular portions of said closure member being adapted to be releasably inserted into a mating head member; and
    said pressure vessel, closure member and reverse osmosis module being an integral disposable unit.

2. The combination of claim 1 including
    means on each of said tubular portions for supporting sealing means thereon.

3. The combination of claim 1 including
    sealing means associated with each of said tubular portions, said tubular portions thereby being adapted to be placed in sealing engagement with portions of a head member disposed in the reverse osmosis system with which the reverse osmosis unit is to be used.

4. The combination of claim 1 including
    an elongated outlet tube attached to said first tubular portion and extending through the center of said reverse osmosis module to define with said module a part of one of the outlet passages from said reverse osmosis unit.

5. In a reverse osmosis unit for use in a reverse osmosis system the combination comprising:
    a pressure vessel adapted to have a reverse osmosis module disposed therein;
    a closure member in permanent sealed relationship with the open end of said pressure vessel, said closure member comprising an annular member including
    an annular rim portion and first, second and third tubular portions, said three portions all being coaxially disposed,
    said first and second tubular portions being radially spaced from each other to define a first opening therebetween,
    said first tubular portion also defining a second opening therethrough;
    said second and third tubular portions also being radially spaced from each other to define a third opening therebetween;
    said first, second and third openings defining an inlet and two outlet fluid passages to lead to and from a reverse osmosis unit with which said closure member is associated; and
    said pressure vessel and closure member being an integral disposable unit.

6. The combination of claim 5 including:
    means on each of said tubular portions for supporting sealing means thereon.

7. The combination of claim 5 including:
    sealing means associated with each of said tubular portions, said tubular portions thereby being adapted to be placed in sealing engagement with portions of a head member disposed in the reverse osmosis system with which the reverse osmosis unit is to be used.

8. The combination of claim 5 including:
    a reverse osmosis module disposed within said pressure vessel and arranged therein to cooperate with the inlet and two outlet ports of said closure member.

9. The combination of claim 8 including:
    an elongated inlet tube attached to said first tubular portion and extending through the center of said reverse osmosis module to define with said module a part of one of the outlet passages from said reverse osmosis unit.

10. The combination of claim 5 wherein:
    said third tubular portion extends axially beyond said rim portion, said second tubular portion extends axially beyond said third tubular portion and said first tubular portion extends axially beyond said second tubular portion.

11. The combination of claim 10 including:
    sealing means associated with the outside surface of each of said tubular portions, said tubular portions thereby being adapted to be placed in sealing engagement with an inlet and two outlet ports of a head member disposed in the system with which the reverse osmosis unit is to be used.

12. An integral disposable reverse osmosis unit comprising:
    a pressure vessel;
    an end member disposed in and permanently attached to the open end of said pressure vessel, said end member being adapted to be inserted into a mating head member:
    a reverse osmosis module disposed within said pressure vessel and operatively connected to said end member, said module including a reverse osmosis membrane;
    means defining a centrally disposed first tubular fluid inlet passage extending through said end member and into the reverse osmosis unit;
    said first tubular fluid inlet passage including an elongated inlet tube which extends longitudinally through the reverse osmosis module;
    means defining a second discharge passage for accepting purified water which is forced through said membrane, said passage extending through said end member;

said second discharge passage being disposed between the reverse osmosis membrane and the elongated inlet tube; and means defining a third waste water discharge passage extending through said end member and adapted to be connected to a waste discharge outlet.

13. The integral disposeable reverse osmosis unit of claim 12 wherein:

said reverse osmosis module includes an elongated perforated tube upon which the module membrance is wound, and a portion of said second discharge passage is disposed between said perforated tube of said module and said elongated inlet tube.

14. A reverse osmosis unit closure member comprising:

an annular member including an annular rim portion and first, second and third tubular portions, said three portions all being coxially disposed and interconnected with each other;

said first and second tubular portions being radially spaced from each other to define a first opening therebetween;

said first tubular portion also defining a second opening therethrough;

said second and third tubular portions also being radially spaced from each other to define a third opening therebetween; and said first, second, and third openings defining inlet and outlet ports to lead to and from a reverse osmosis unit with which said closure member is adapted to be associated.

15. The reverse osmosis unit closure member of claim 14 including:

means on each of said tubular portions for supporting sealing means thereon.

16. The reverse osmosis unit closure member of claim 14 wherein:

one of said openings defines an inlet opening, a second opening defines an opening through which purified fluid is discharged, and a third opening defines an opening through which waste fluid is discharged.

17. The reverse osmosis unit closure member of claim 14 wherein:

one of said openings defines an inlet opening, a second opening defines an opening adapted to be connected to a purified fluid discharge conduit, and a third opening defines an opening adapted to be connected to a waste discharge conduit.

18. The combination of claim 14 wherein:

said third tubular portion extends axially beyond said rim portion, said second tubular portion extends axially beyond said third tubular portion and said first tubular portion extends axially beyond said second tubular portion.

19. In a reverse osmosis system the combination comprising:

a head adapted to be fixedly mounted;

a fluid inlet port and a pair of outlet ports formed in said head;

a reverse osmosis unit inserted into said head;

means for releasably securing said reverse osmosis unit in said head;

said reverse osmosis unit comprising an integral disposable unit including a pressure vessel having a reverse osmosis module disposed therein and an end member in permanent sealed relationship with the open end of said pressure vessel, said end member including an annular rim portion and first, second and third tubular positions, said three portions all being coxially disposed;

said third tubular portion extending axially beyond said rim portion, said second tubular portion extending axially beyond said third tubular portion, said first tubular portion extending axially beyond said second tubular portion;

said first and second tubular portions being radially spaced from each other to define a fluid passage therebetween;

said first tubular portion also defining a second fluid passage therethrough;

said second and third tubular portions also being radially spaced from each other to define a third fluid passage therebetween;

said first, second and third passages defining inlet and outlet ports to lead to and from a reverse osmosis unit with which said end member is associated.

20. The combination of claim 19 including:

means on each of said tubular portions for supporting sealing means thereon.

21. The combination of claim 19 wherein:

one of said openings defines an inlet opening, a second opening defines an opening through which purified fluid is discharged, and a third opening defines an opening through which waste fluid is discharged.

* * * * *